(12) United States Patent
Tamai et al.

(10) Patent No.: US 6,678,620 B1
(45) Date of Patent: Jan. 13, 2004

(54) METHOD FOR PROMOTING ENERGY SAVING IN FLUID MACHINERY

(75) Inventors: Hiromi Tamai, Kawasaki (JP); Kiyoshi Ichikawa, Tokyo (JP); Yoshio Miyake, Fujisawa (JP)

(73) Assignee: Ebara Corporation, Tokyo (JP)

( * ) Notice: Subject to any disclaimer, the term of this patent is extended or adjusted under 35 U.S.C. 154(b) by 291 days.

(21) Appl. No.: 09/688,087

(22) Filed: Oct. 16, 2000

(30) Foreign Application Priority Data

Jun. 13, 2000 (JP) ...................................... 2000-177657

(51) Int. Cl.[7] ................................................. H02J 3/14
(52) U.S. Cl. ....................................................... 702/61
(58) Field of Search ........................... 702/61, 179, 60, 702/64, 65, 108, 122, 124, 125, 127; 111/11; 418/55.1; 340/825; 379/102

(56) References Cited

U.S. PATENT DOCUMENTS 5,544,036 A * 8/1996 Brown et al. ........... 340/825.24
6,493,643 B1 * 12/2002 Aisa .............................. 702/60

FOREIGN PATENT DOCUMENTS

JP 55-31907 3/1980
JP 55-31908 3/1980

* cited by examiner

Primary Examiner—John Barlow
Assistant Examiner—Tung Lau
(74) Attorney, Agent, or Firm—Oblon, Spivak, McClelland, Maier & Neustadt, P.C.

(57) ABSTRACT

A method for promoting energy saving in fluid machinery reduces electric power consumption of fluid machinery by introducing an energy-saving device such as an inverter into existing fluid machinery such as a pump. The method comprises submitting data specifying characteristics of the fluid machinery of a user to a service provider, and estimating an energy-saving effect due to introduction of an energy-saving device into the fluid machinery based on the data specifying characteristics of the fluid machinery and an energy-saving ratio predetermined according to a purpose of fluid machinery. The method further comprises selecting an effective energy-saving device to be introduced, and surveying an operating state of the fluid machinery. The method further comprises calculating an energy-saving effect based on data obtained from the survey, and offering the estimated energy-saving effect, the calculated energy-saving effect, and the selected energy-saving device.

6 Claims, 12 Drawing Sheets

Diagnostic summary sheet for pumps (in order of payback years)

| installation site | name of the pump | purpose of the pump | operating time (hr/day, day/y) | design requirements (Q l/min, Hm) | output of a motor (kw) | liquid temperature (°C) | liquid type | pump maker | type | selection criteria | serial number | electric power consumption (kWh/year) | predicted reduction percentage | reduction in electric power consumption (kWh/year) | reduction in power rate (yen/year) | replacement (1) type | replacement (1) price | simple payback years (year) | replacement (2) type | replacement (2) price | simple payback years (year) |
|---|---|---|---|---|---|---|---|---|---|---|---|---|---|---|---|---|---|---|---|---|---|
| 86 A factory | ○○ circulating pump | *1 | 24 / 365 | 2000 / 19 | 11 | | | | 125SGM | *2 | TW30360-D5 | 96,360 | 35% | 33,726 | 404,712 | EECF511L | 378,000 | 0.9 | EECF511L | 378,000 | 0.9 |
| 89 B factory | ××× circulating pump | *1 | 24 / 365 | 1250 / 21 | 7.5 | | | | 100SGM | *2 | T131353-15 | 65,700 | 35% | 22,995 | 275,940 | EECF57.5H | 334,000 | 1.2 | EECF57.5H | 334,000 | 1.2 |
| 17 C factory | ○○○ circulating pump | *1 | 24 / 365 | N/A / N/A | 3.5 | | | | LPD | *2 | N/A | 32,412 | 35% | 11,344 | 136,130 | EECF53.7H | 172,000 | 1.3 | EECF53.7H | 172,000 | 1.3 |
| 32 D factory | ×× circulating pump | *1 | 24 / 365 | 800 / 16 | 3.7 | | | | 80SGM | *2 | TE30341-55 | 32,412 | 35% | 11,344 | 136,130 | EECF53.7H | 172,000 | 1.3 | 65MMLF03.6 | 462,000 | 3.4 |
| 33 E factory | △△ circulating pump | *1 | 24 / 365 | 800 / 16 | 3.7 | | | | 80SGM | *2 | TB30341-53 | 32,412 | 35% | 11,344 | 136,130 | EECF53.7H | 172,000 | 1.3 | 65MMLF03.6 | 462,000 | 3.4 |
| 41 F factory | △△△ circulating pump | *1 | 24 / 365 | N/A / N/A | 3.7 | | | | 80S | *2 | N/A | 32,412 | 35% | 11,344 | 136,130 | EECF53.7H | 172,000 | 1.3 | 65MMLF03.6 | 462,000 | 3.4 |
| | circulating | *1 | 24 / 365 | 800 / 16 | 3.7 | | | | 80SGM | *2 | T130341-52 | 32,412 | 35% | | | | | | 65MMLF03.6 | 462,000 | |
| | | | 365 | 320 / 32.5 | | | | | 50LPD53.7 | | | | | | | | | | | | |

*1 circulating
*2 power

FIG. 3

Tabulation tables by purpose

I. Current electric power consumption

| | Circulating | Conveying | Storage | Total |
|---|---|---|---|---|
| Number of installed pumps | 60 | 33 | 12 | 105 |
| Number of targets | 55 | 27 | 4 | 86 |
| Average output (kW) | 8.3 | 15.7 | 28.9 | 11.6 |
| Average annual operating days per year | 316.9 | 357.0 | 365.0 | 331.7 |
| Average operating hours per day | 21.8 | 17.1 | 10.5 | 19.8 |
| Annual electric power consumption (kW/year) | 2,231,124 | 1,875,893 | 223,015 | 4,330,032 |

II. Predicted reduction in electric power consumption

| | Circulating | Conveying | Storage | Total |
|---|---|---|---|---|
| Predicted reduction percentage | 30% | 16% | 10% | 23% |
| Reduction in electric power consumption (kWh/year) | 662,008 | 300,921 | 22,302 | 985,230 |
| Annual amount of reduced $CO_2$ (t$CO_2$/year) | 252.2 | 114.7 | 8.5 | 375.4 |
| Unit power rate (yen/kWh) | 12 | 12 | 12 | 12 |
| Reduction in power rate (yen) | 7,944,095 | 3,611,046 | 267,618 | 11,822,759 |

III. Estimated investment (1) Installing inverter

| | Circulating | Conveying | Storage | Total |
|---|---|---|---|---|
| Amount of investment (yen) | 19,654,000 | 12,242,000 | 1,400,000 | 33,296,000 |
| Simple payback years | 2.5 | 3.4 | 5.2 | 2.8 |

(2) Installing pump with inverter

| | Circulating | Conveying | Storage | Total |
|---|---|---|---|---|
| Amount of investment (yen) | 24,642,000 | 13,396,000 | 1,400,000 | 39,438,000 |
| Simple payback years | 3.1 | 3.7 | 5.2 | 3.3 |

| | | | | | |
|---|---|---|---|---|---|
| Installation site | □ | □ | □ | □ — F11 | |
| Name of pump | □ | □ | □ | □ — F12 | |
| Purpose | ○Circulating<br>○Conveying<br>○Storage | ○Circulating<br>○Conveying<br>○Storage | ○Circulating<br>○Conveying<br>○Storage | ○Circulating<br>○Conveying<br>○Storage | } C11 |
| Operating time | | | | | |
|   Operating time per day (hrs/day) | □ | □ | □ | □ — F13 | |
|   Operating days per year (days/year) | □ | □ | □ | □ — F14 | |
| Design requirements | | | | | |
|   Flow rate (l/min) | □ | □ | □ | □ — F15 | |
|   Head (m) | □ | □ | □ | □ — F16 | |
| Rated output of motor (kw) | □ | □ | □ | □ — F17 | |
| Selection criteria | ○Power criteria<br>○Requirement criteria | ○Power criteria<br>○Requirement criteria | ○Power criteria<br>○Requirement criteria | ○Power criteria<br>○Requirement criteria | } C12 |

P1

[ Diagnostic Summary ] — B11

FIG. 10

Diagnostic summary sheet for pumps (in order of payback years)

| installation site | name of the pump | purpose of the pump | operating time hr/day | operating time day/y | design requirements Q l/min | design requirements Hm | output of a motor kw | liquid temperature ℃ | liquid type | pump maker | type | selection criteria | serial number | electric power consumption kWh/year | predicted reduction percentage | reduction in electric power consumption kWh/year | reduction in power rate yen/year | replacement (1) type | replacement (1) price | simple payback years year | replacement (2) type | replacement (2) price | simple payback years year |
|---|---|---|---|---|---|---|---|---|---|---|---|---|---|---|---|---|---|---|---|---|---|---|---|
| A 86 factory | ○○ circulating pump | *1 | 24 | 365 | 2000 | 19 | 11 | | | | 125 SGM | *3 | TW30360-D5 | 96,360 | 35% | 33,726 | 404,712 | EECF51IL | 378,000 | 0.9 | EECF51IL | 378,000 | 0.9 |
| B 89 factory | ×××circulating pump | *1 | 24 | 365 | 1250 | 21 | 7.5 | | | | 100 SGM | *3 | TJ31353-15 | 65,700 | 35% | 22,995 | 275,940 | EECF57.5H | 334,000 | 1.2 | EECF57.5H | 334,000 | 1.2 |
| C 17 factory | ○○○circulating pump | *1 | 24 | 365 | N/A | N/A | 3.5 | | | | LPD | *3 | N/A | 32,412 | 35% | 11,344 | 136,130 | EECF53.7H | 172,000 | 1.3 | EECF57.5H | 172,000 | 1.3 |
| D 32 factory | ×× circulating pump | *1 | 24 | 365 | 800 | 16 | 3.7 | | | | 80 SGM | *3 | TE30341-55 | 32,412 | 35% | 11,344 | 136,130 | EECF53.7H | 172,000 | 1.3 | 65MMLF03.6 | 462,000 | 3.4 |
| E 33 factory | △△ circulating pump | *1 | 24 | 365 | 800 | 16 | 3.7 | | | | 80 SGM | *3 | TB30341-53 | 32,412 | 35% | 11,344 | 136,130 | EECF53.7H | 172,000 | 1.3 | 65MMLF03.6 | 462,000 | 3.4 |
| F 41 factory | △△△circulating pump | *1 | 24 | 365 | N/A | N/A | 3.7 | | | | 80S | *3 | N/A | 32,412 | 35% | 11,344 | 136,130 | EECF53.7H | 172,000 | 1.3 | 65MMLF03.6 | 462,000 | 3.4 |
| | ...ating | *1 | 24 | 365 | 320 | 32.5 | 3.7 | | | | 80 SGM | *3 | TJ30341-52 | 32,412 | | | | | | | 65MMLF03.6 | 462,000 | 3.4 |
| | | | | | | | | | | | 50LPD53.7 | | | | | | | | | | | | |
| K 80 factory | ○○ conveying pump | *2 | 1 | 365 | N/A | | 11 | | | | | *3 | T23650 | 2,008 | 10% | 201 | 2,409 | EECF55.5H | 272,000 | 112.9 | EECF55.5H | 272,000 | 112.9 |
| L 84 factory | ×××storage pump | *2 | 0 | 0 | 710 | 50 | 11 | | | | | *3 | T23650 | 0 | | | | | | | | | |
| M 86 factory | ×× storage pump | *2 | 0 | 0 | 450 | 47 | 7.5 | | | | | *3 | TJ32550-12 | 3 | | | | | | | | | |
| | | | | | | | | | | | | | | 4,330,032 | 22.8% | 985,230 | 11,822,759 | | 33,296,000 | 2.8 | | 39,438,000 | 3.3 |

Tabulation Page ~B21

*1 circulating  *3 power
*2 storage

| Tabulation tables by purpose | | | | |
|---|---|---|---|---|
| | Circulating | Conveying | Storage | Total |
| I. Current electric power consumption | | | | |
| Number of installed pumps | 60 | 33 | 12 | 105 |
| Number of targets | 55 | 27 | 4 | 86 |
| Average output(kW) | 8.3 | 15.7 | 28.9 | 11.6 |
| Average annual operating days per year | 316.9 | 357.0 | 365.0 | 331.7 |
| Average operating hours per day | 21.8 | 17.1 | 10.5 | 19.8 |
| Annual electric power consumption (kW/year) | 2,231,124 | 1,875,893 | 223,015 | 4,330,032 |
| II. Predicted reduction in electric power consumption | | | | |
| Predicted reduction percentage | 30% | 16% | 10% | 23% |
| Reduction in electric power consumption (kWh/year) | 662,008 | 300,921 | 22,302 | 985,230 |
| Annual amount of reduced $CO_2$ (t$CO_2$/year) | 252.2 | 114.7 | 8.5 | 375.4 |
| Unit power rate (yen/kWh) | 12 | 12 | 12 | 12 |
| Reduction in power rate (yen) | 7,944,095 | 3,611,046 | 267,618 | 11,822,759 |

III. Estimated investment
(1) Installing inverter

| | Circulating | Conveying | Storage | Total |
|---|---|---|---|---|
| Amount of investment (yen) | 19,654,000 | 12,242,000 | 1,400,000 | 33,296,000 |
| Simple payback years | 2.5 | 3.4 | 5.2 | 2.8 |

(2) Installing pump with inverter

| | Circulating | Conveying | Storage | Total |
|---|---|---|---|---|
| Amount of investment (yen) | 24,642,000 | 13,396,000 | 1,400,000 | 39,438,000 |
| Simple payback years | 3.1 | 3.7 | 5.2 | 3.3 |

B31 — [ Order ]

FIG. 12

METHOD FOR PROMOTING ENERGY SAVING IN FLUID MACHINERY

BACKGROUND OF THE INVENTION

1. Field of the Invention

The present invention relates to a method for promoting energy saving in fluid machinery, and more particularly to a method for reducing electric power consumption of fluid machinery by introducing an energy-saving device such as an inverter into existing fluid machinery such as a pump.

2. Description of the Related Art

Recently, there has been more and more demand for energy saving in businesses and factories from the viewpoint of environmental protection. In response to such demand, various laws concerning energy saving have been established, further increasing the necessity for energy saving in businesses and factories. Particularly, a great number of small- and medium-size pumps are installed in buildings and factories. The energy consumption of these pumps accounts for an unexpectedly high ratio of overall energy consumption. For example, some cases have been reported where energy consumption of pumps accounts for 13% of overall energy consumption. Therefore, it has been very meaningful to try to save energy in these general-purpose pumps.

Generally, a general-purpose pump is not manufactured so as to meet specific requirements (flow rate and head). A general-purpose pump is selected from stocks having specifications that exceed necessary requirements. Further, design requirements are calculated based on a maximum flow rate estimated with a certain margin. Additionally, energy loss in piping is estimated in consideration of a margin and aged deterioration. Therefore, in actual operations, valves are adjusted to restrain an excessive flow rate, thereby causing wasteful energy consumption.

There has been known a technology for reducing such wasteful energy consumption by controlling a rotational speed of a pump with use of an inverter (frequency converter) combined with the pump. This technology uses the inverter to control (decelerate) the rotational speed of the pump so that the operations of the pump agree with the minimum required flow rate and head (true requirements), which cannot be found until performing actual operations at the site. Introduction of such an inverter can greatly save energy. It has been reported that an average power reduction of 35%, for example, can be achieved by this technology.

When an inverter is introduced to reduce wasteful energy consumption, it is necessary to find the above true requirements and to find the difference between these requirements and an actual operating point. However, it is very difficult to find and verify these values before introduction of the inverter into a pump. Specifically, in order to find how much energy can be saved by varying the rotational speed of the pump, it is necessary to obtain data on motor efficiency, inverter efficiency, and the like, and to perform complex simulations. Accordingly, it takes much time to estimate cost-effectiveness of introduction of an energy-saving device into an existing pump. Therefore, energy saving is not sufficiently achieved in the present state.

SUMMARY OF THE INVENTION

The present invention has been made in view of the above drawbacks. It is therefore an object of the present invention to provide a method for promoting energy saving in fluid machinery in which an energy-saving effect in the fluid machinery can easily be realized without performing complex simulations, and energy saving can positively be promoted without imposing a burden on a user.

According to an aspect of the present invention, there is provided a method for reducing electric power consumption and promoting energy saving in fluid machinery by introducing an energy-saving device into existing fluid machinery, the method comprising: submitting data specifying characteristics of the fluid machinery of a user to a service provider; estimating an energy-saving effect due to introduction of an energy-saving device into the fluid machinery based on the data specifying characteristics of the fluid machinery and an energy-saving ratio predetermined according to a purpose of fluid machinery; selecting an effective energy-saving device to be introduced; and offering the estimated energy-saving effect and the selected energy-saving device.

According to another aspect of the present invention, there is provided a method for reducing electric power consumption and promoting energy saving in fluid machinery by introducing an energy-saving device into existing fluid machinery, the method comprising: submitting data specifying characteristics of the fluid machinery of a user to a service provider; estimating an energy-saving effect due to introduction of an energy-saving device into the fluid machinery based on the data specifying characteristics of the fluid machinery and an energy-saving ratio predetermined according to a purpose of fluid machinery; selecting an effective energy-saving device to be introduced; surveying an operating state of the fluid machinery; calculating an energy-saving effect based on data obtained from the survey; and offering the estimated energy-saving effect, the calculated energy-saving effect, and the selected energy-saving device.

Hereinafter, introduction of an energy-saving device into an existing pump is defined as installation of the energy-saving device in the existing pump, and replacement of the existing pump with a pump having an energy-saving device.

With these methods, it is possible to realize the energy-saving effect in fluid machinery easily without performing complex simulations.

In a preferred aspect of the present invention, the method for promoting energy saving in fluid machinery further comprising: surveying an operating state of the fluid machinery after introduction of the energy-saving device; and measuring an actual energy-saving effect achieved by introduction of the energy-saving device.

In a preferred aspect of the present invention, the method for promoting energy saving in fluid machinery further comprising: modifying the energy-saving ratio based on the measured actual energy-saving effect. This method can improve the energy-saving ratio and hence causes diagnoses performed by the service provider to be more accurate.

In a preferred aspect of the present invention, the service provider introduces the energy-saving device into the fluid machinery gratis, in exchange for payment of all or a part of an actual reduced cost due to introduction of the energy-saving device. This method can substantially eliminate the initial investment of the user, thereby positively promoting energy saving without imposing a burden on the user.

In a preferred aspect of the present invention, information communicated between the user and the service provider is transmitted by a client terminal on a user end and a server on a service provider end connected to each other via a network. Accordingly, the user even distant from the service provider can easily realize the energy-saving effect in fluid machinery.

In a preferred aspect of the present invention, customer data concerning the user is stored in a database on the server.

In a preferred aspect of the present invention, the service provider transmits to the server the calculated energy-saving effect based on data obtained from the survey.

In a preferred aspect of the present invention, the energy-saving device comprises a frequency converter having an adjustable output frequency, the energy-saving device being installed near the fluid machinery.

In a preferred aspect of the present invention, the energy-saving device is cooled by a fluid handled by the fluid machinery.

In a preferred aspect of the present invention, the fluid machinery comprises a pump..

According to another aspect of the present invention, there is provided a method for diagnosing a reduction in electric power consumption due to introduction of an energy-saving device into existing fluid machinery, the method comprising: estimating an energy-saving effect due to introduction of an energy-saving device into the fluid machinery based on data specifying characteristics of the fluid machinery and an energy-saving ratio predetermined according to a purpose of fluid machinery; selecting an effective energy-saving device to be introduced; and offering the estimated energy-saving effect and the selected energy-saving device.

According to another aspect of the present invention, there is provided a transaction method for promoting energy saving in fluid machinery, the transaction method comprising: estimating an energy-saving effect of the fluid machinery based on data specifying characteristics of the fluid machinery; and offering the estimated energy-saving effect, an energy-saving device meeting the estimated energy-saving effect, and a form of a transaction for the energy-saving device.

According to another aspect of the present invention, there is provided a transaction method for promoting energy saving in fluid machinery, the transaction method comprising: estimating an energy-saving effect of the fluid machinery based on data specifying characteristics of the fluid machinery; and surveying an operating state of the fluid machinery; calculating an energy-saving effect based on data obtained from the survey; and offering the estimated energy-saving effect, the calculated energy-saving effect, an energy-saving device meeting the estimated energy-saving effect, and a form of a transaction for the energy-saving device.

In a preferred aspect of the present invention, the form of a transaction is selected from options of purchasing or leasing, or introduction of the energy-saving device into the fluid machinery gratis in exchange for payment of all or a part of actual reduced cost.

In a preferred aspect of the present invention, all or a part of information communicated between a user and a service provider is transmitted via a network.

The above and other objects, features, and advantages of the present invention will be apparent from the following description when taken in conjunction with the accompanying drawings which illustrates preferred embodiments of the present invention by way of example.

BRIEF DESCRIPTION OF THE DRAWINGS

FIG. 2 is a schematic view showing an example of a diagnostic summary according to the first embodiment of the present invention;

DETAILED DESCRIPTION OF THE PREFERRED EMBODIMENTS

Figure 1:
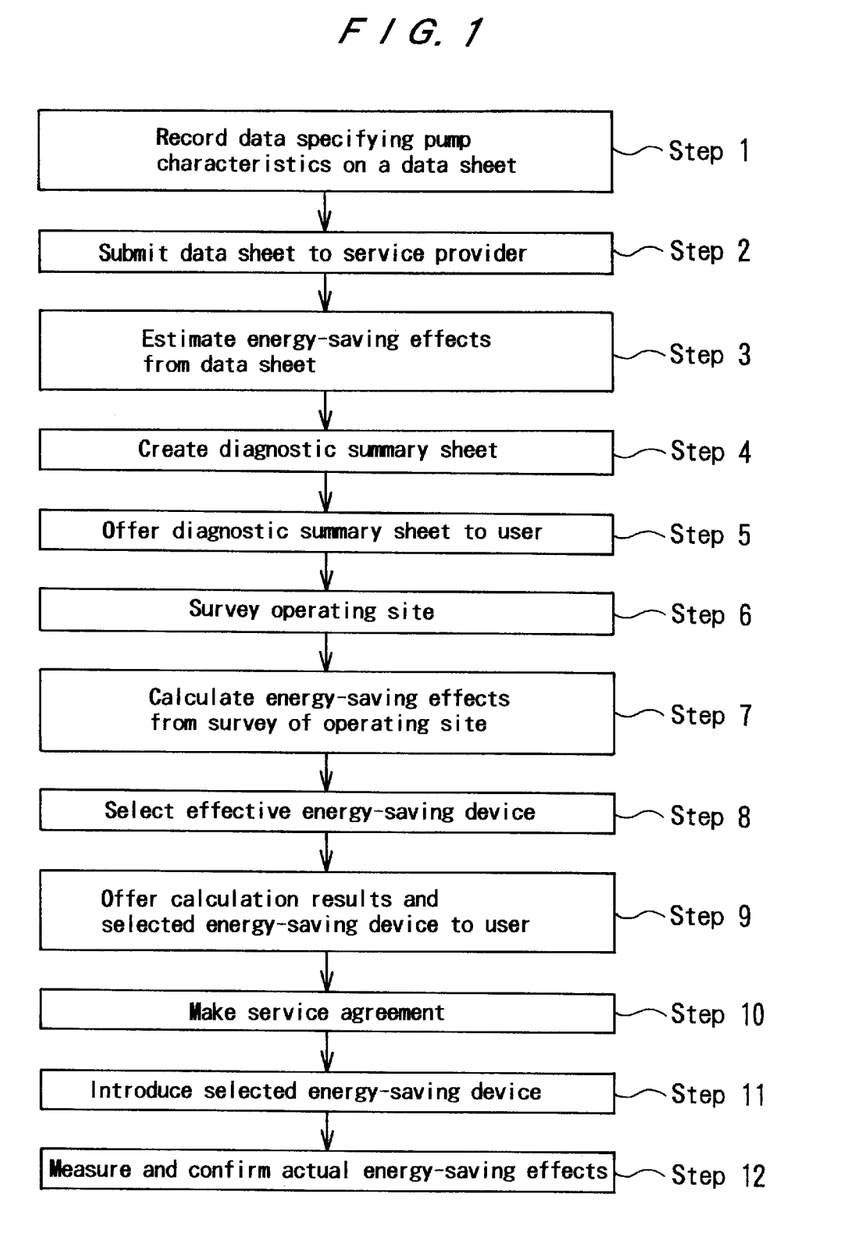
FIG. 1 is a flowchart showing a process flow in a method for promoting energy saving in fluid machinery according to a first embodiment of the present invention.
Figure 3:
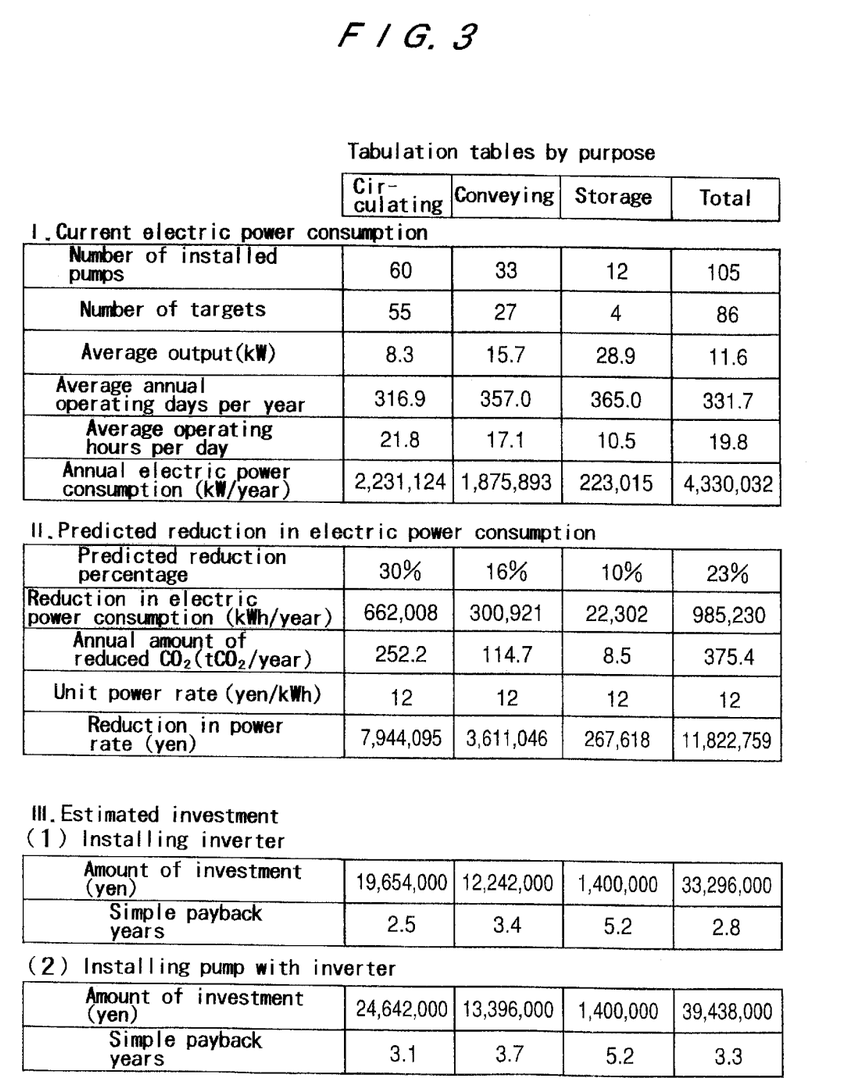
FIG. 3 is a schematic view showing an example of a diagnostic summary according to the first embodiment of the present invention.

A method for promoting energy saving in fluid machinery according to a first embodiment of the present invention will be described below with reference to FIGS. 1 through 3. In the present embodiments, a pump will be described as an example of the fluid machinery. FIG. 1 is a flowchart showing a process flow in a method for promoting energy saving in fluid machinery according to the first embodiment of the present invention.

A user, who seeks to save energy in fluid machinery such as a pump, records data specifying characteristics of an existing pump onto a data sheet prepared by a service provider, who offers an energy-saving system according to the present invention (Step 1). The user submits the data sheet to the service provider (Step 2). For example, data specifying characteristics of the pump may include the number of existing pumps, an installation site of a pump, a name of the pump, a purpose of the pump, selection criteria, operating hours per day, operating days per year, flow rate and head in design requirements, and a rated output of a motor in the pump. An energy-saving effect described later is calculated based on these data.

The user selects a purpose of each of existing pumps among a circulating pump in which most of a total head is consumed by resistance in piping, a conveying pump (water supply pump) in which about one-half of a total head is consumed by resistance in piping, and a storage pump (transfer pump) in which about 20% of a total head is consumed by resistance in piping. Then, the user records the selected purposes of the pumps onto the data sheet. Further, the user selects the selection criteria from power criteria which is based on pump characteristics corresponding to a motor output, and requirement criteria which is based on pump characteristics corresponding to requirements specified by a user. Then, the user records the selected criteria onto the data sheet.

After receiving the data sheet from the user, the service provider estimates energy-saving effects that can be achieved by introducing an energy-saving device into an existing pump (Step 3). As described above, introduction of an energy-saving device into an existing pump includes installation of the energy-saving device in the existing pump, and replacement of the existing pump with a pump having an energy-saving device. The energy-saving effects are estimated based on the data recorded on the data sheet and average energy-saving ratios (power reduction ratios) predetermined according to purposes of pumps. In the present embodiment, the energy-saving ratio S is expressed by the following equation.

$$S = 1 - \left(\frac{Q_0 \times H_0}{Q_2 \times H_2}\right) \times \frac{1}{\eta i} = 1 - \left(\frac{Q_0 \times H_0}{Q_1 \times H_1}\right) \times \left(\frac{Q_1 \times H_1}{Q_2 \times H_2}\right) \times \frac{1}{\eta i} \quad \text{Equation 1}$$

Here, $Q_0$ and $H_0$ represent true requirements, $Q_0$ a truly necessary discharge flow rate, $H_0$ a truly necessary total head (pressure), $Q_1$ and $H_1$ design requirements, $Q_1$ a designed discharge flow rate, $H_1$ a designed total head, $Q_2$ and $H_2$ operation points at the site, $Q_2$ a discharge flow rate at the site, $H_2$ a total head at the site, and $\eta i$ an inverter efficiency.

In the present embodiment, each of the average energy-saving ratios S of Equation 1 is calculated under each of conditions listed in Tables 1 and 2 below. This average value is used as the energy-saving ratio S (%). The average energy-saving ratios S used in the present embodiment are listed in Table 3 below.

TABLE 1

|  | Circulating | Conveying (Water supply) | Storage (Transfer) |
|---|---|---|---|
| $\frac{Q_0 \times H_0}{Q_1 \times H_1}$ | 0.7 | 0.8 | 0.85 |

TABLE 2

|  | Power Criteria | | Requirement Criteria |
|---|---|---|---|
|  | 1.5–15 kW | 18.5–75 kW |  |
| $\frac{Q_1 \times H_1}{Q_2 \times H_2}$ | 0.85 | 0.9 | 1.0 |

TABLE 3

|  | Power Criteria | | Requirement Criteria |
|---|---|---|---|
|  | 1.5–15 kW | 18.5–75 kW |  |
| Circulating | 35% | 30% | 25% |
| Conveying (Water supply) | 25% | 20% | 15% |
| Storage (Transfer) | 10% | 10% | — |

The service provider calculates the following values using the above average energy-saving ratio S to estimate the energy-saving effects that can be achieved by introduction of an inverter. The service provider further calculates an average value of these calculations for each of pump purposes (circulating, conveying, and storage). Thereafter, the service provider tabulates the calculation results.

Annual electric power consumption (kWh/year)=rated output of motor (kW)×operating hours per day (hrs/day)× operating days per year (days/year)

Potential reduction in electric power consumption (kWh/year)=annual electric power consumption (kWh/year)× average energy-saving ratio S (%)

Potential reduction in power rate (yen/year)=potential reduction in electric power consumption (kWh/year)×unit power rate (yen/kWh)

Amount of investment for introduction of inverter into existing pump (yen)=unit cost of inverter (yen)×number of inverters Simple payback years (years required simply for recovery of investment) in this case (years)=amount of investment (yen)/potential reduction in power rate (yen/year)

Amount of investment for replacing existing pump with pump having inverter (yen)=unit cost of pump with inverter (yen)×number of pumps Simple payback years in this case (years)=amount of investment (yen)/potential reduction in power rate (yen/year)

Annual amount of reduced $CO_2$ (t$CO_2$/year)=potential reduction in electric power consumption (kWh/year)× 0.000381 (t$CO_2$/kWh)

It is apparent from the above equations that, in the present embodiment, the calculations are performed on the assumption that a rated output of the motor is equivalent to electric power consumption in the operation. The coefficient 0.000381 (t$CO_2$/kWh) used to calculate the annual amount of reduced $CO_2$ is an emission factor for carbon dioxide proposed in the Environmental Activities Evaluation Program of the Environment Agency of Japan.

The service provider summarizes the estimation of the energy-saving effects in a diagnostic summary sheet (Step 4). The service provider offers the diagnostic summary sheet to the user (Step 5). FIGS. 2 and 3 show examples of the diagnostic summary sheet. The user views the diagnostic summary sheet, so that the energy-saving effects due to introduction of the inverter into the existing pumps can easily be realized.

In order to provide more accurate examination materials to the user, the service provider visits the user in person to carry out a site survey including a survey of the existing pump and its peripheral devices, measurement of operating conditions of the pump, and measurement of electric power consumption of the pump in operation or the like as the case may be (Step 6). The service provider further calculates the energy-saving effects based on this survey data (Step 7). A suitable method for performing such calculations is disclosed in PCT Publication No. WO99/51883. However, the present invention is not limited to this method. With this method, in the case of pumps, electric power consumption of a pump is measured by a simple mountable wattmeter, or the operating pressure is measured by use of a compound gauge mounted on a suction side of the pump and a pressure gauge mounted on a discharge side of the pump. The measured values are inputted into a computer, which performs calculations based on certain equations. Thus, it is possible to calculate energy-saving effects such as potential reduction in electric power consumption easily and properly.

The service provider examines the calculation results of the energy-saving effects based on the site survey, and then selects the most effective inverter or pump with an inverter among several energy-saving devices (Step 8). The service provider offers the calculation results and the selected energy-saving device to the user (Step 9).

The user examines the calculation results and the selected energy-saving device offered from the service provider. When the user decides to save energy with the offer, the user makes a service agreement for energy saving with the service provider (Step 10). The service provider introduces the selected inverter or pump with an inverter, preferably a build-in inverter into the existing pump via installation, wiring and piping, trial operation, and adjustment (Step 11). After introduction of the energy-saving device, the service provider visits the user in person to measure and confirm the actual energy-saving effects achieved by introducing the energy-saving device (Step 12). For example, the service provider measures electric power consumption using a simple mountable wattmeter, compares the electric power consumption before and after introduction of the energy-saving device, and verifies whether the expected energy-saving effects have been achieved or not. Alternatively, the service provider may measure transitive electric power during a certain period using an installed wattmeter. Further, the service provider may monitor daily operation data and grasp the energy-saving amount and cost due to the energy-saving effects to determine the payment (settlement) for the service provider.

The user and the service provider may make an agreement that, for example, the service provider introduces the inverter into the existing pumps gratis, in exchange for payment of all or a part of the actual reduced cost (power rate) due to introduction of the inverter. This method can substantially eliminate the initial investment of the user, thereby positively promoting energy saving without imposing a burden on the user.

The inverter used in the present system will be described below. Suitable examples of such an inverter are disclosed in PCT Publication No. WO99/45273. Such an inverter comprises a frequency converter accommodated in an aluminum alloy case and is installed on a surface of a piping connected to an existing pump. The features of this inverter will briefly be described below.

(1) Pump Installed Type

Generally, it is difficult to add an inverter to a control panel or a power panel due to space limitations and requirement of time and money. However, the pump installed type inverter can be installed on the pump side. Therefore, the space restrictions can be eliminated, and energy saving in various pumps can be most suitably achieved. This inverter can be used by simply putting the inverter in existing power lines. The pump can be turned on and off as usual by simply switching on and off a power supply on a control panel. Further, since the inverter body can be installed on the piping of the pump, this inverter can eliminate the need for special installation space.

(2) Water-cooled Outdoor Type

A general inverter should not be used in humid, dusty, and high-temperature environments. Therefore, a general inverter is restricted in installation areas. However, a water-cooled outdoor type inverter can be installed on a piping of the pump and is water-cooled by the fluid handled by the pump. The inverter case has an airtight construction to prevent the generation of dew condensation therein. Accordingly, the inverter can be applied to pumps of various purposes, including an outdoor pump.

(3) Pump Dedicated Type

A general-purpose inverter requires complex initializations including selection of a drive mode. However, since the pump performance can be adjusted manually by a knob having eight settings of a pump dedicated type inverter, this type of inverter can eliminate such complex initializations. Therefore, reliable energy-saving effects an easily be achieved.

Use of these types of frequency converter assemblies can reduce expenses for modifications of a control panel and the like and for construction. When inverters are required to support a large number of fluid machinery, these types of inverters are extremely effective for promoting energy saving.

A method for promoting energy saving in fluid machinery according to a second embodiment of the present invention will be described below with reference to FIGS. 4 through 12. In the second embodiment, a network is utilized in the method for promoting energy saving of the first embodiment. Like parts and components are designated by the same reference numerals and characters as those shown in the first embodiment.

Figure 4:
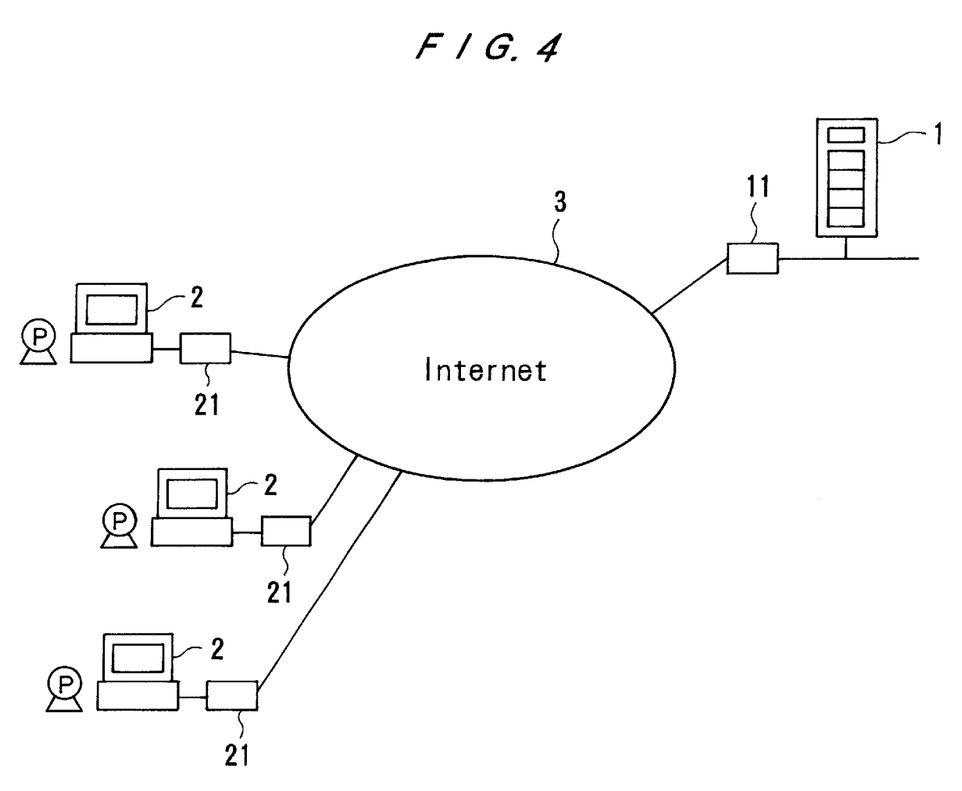
FIG. 4 is a schematic diagram showing a construction of a network according to a second embodiment of the present invention.

FIG. 4 is a schematic diagram showing a construction of a network in the second embodiment of the present invention. As shown in FIG. 4, a server 1 and client terminals 2 basically constitute a network system according to the second embodiment of the present invention. The server 1 is administered by the aforementioned service provider. Each of the client terminals 2 is operated by the aforementioned user.

As shown in FIG. 4, the server 1 is connected to the Internet 3 via a communication device 11 such as a router. Each of the client terminals 2 installed on the user ends is connected to the Internet 3 via a communication device 21 such as a modem, a terminal adapter (TA), or a router. The server 1 has a Web server function and can hence be accessed via the Internet 3 by the client terminals 2. Generally, the client terminal 2 and the server 1 communicate to each other with the HyperText Transfer Protocol (HTTP). However, another protocol may be used instead.

Figure 5:
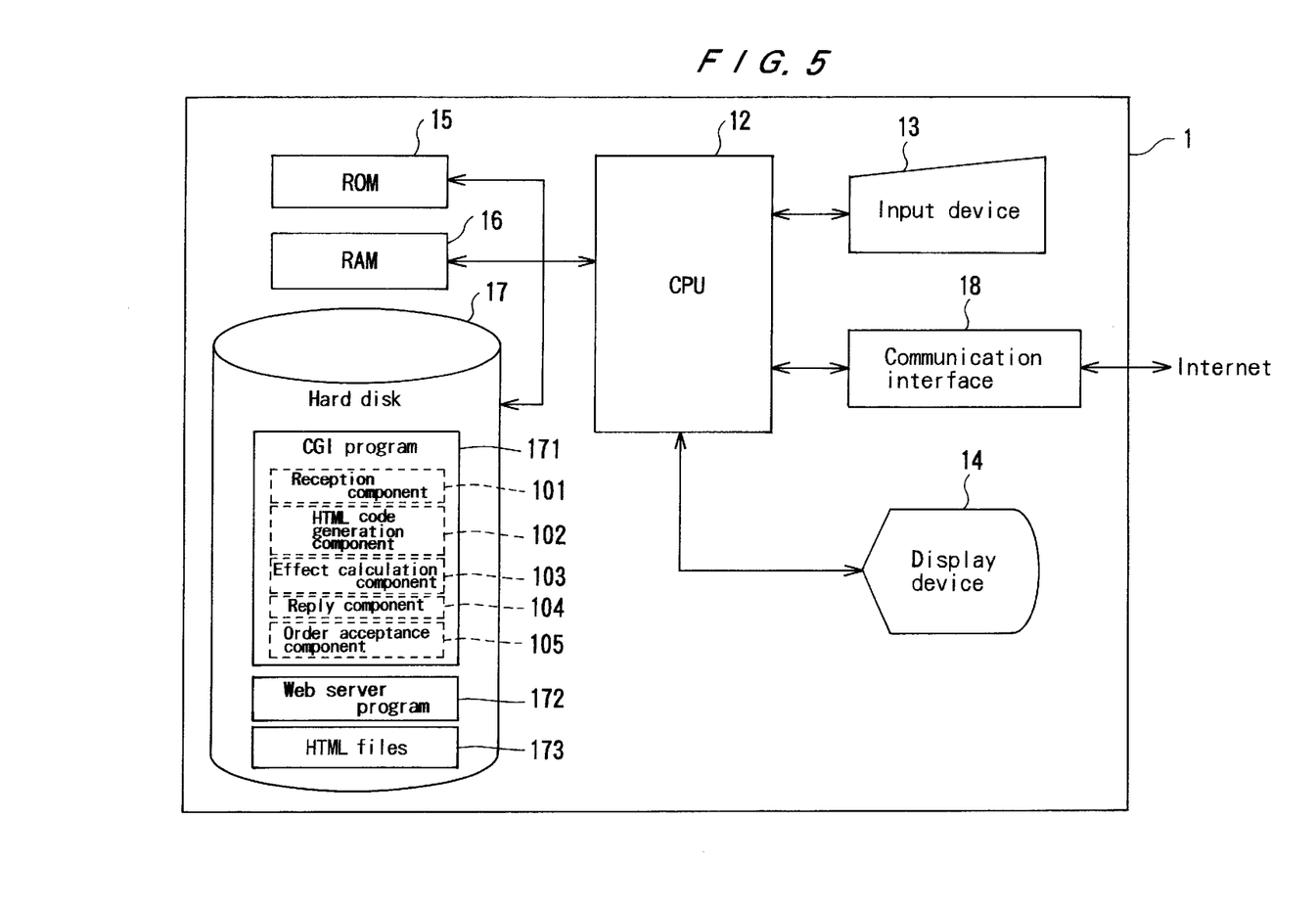
FIG. 5 is a block diagram showing an example of a hardware construction in a server according to the second embodiment of the present invention.

FIG. 5 is a block diagram showing an example of a hardware construction in the server 1 according to the present embodiment. The server 1 in the present embodiment is configured by an ordinary network server computer, a personal computer, or the like. As shown in FIG. 5, the server 1 comprises a central processing unit (CPU) 12, an input device 13 such as a keyboard or a mouse, a display device 14 such as a monitor, storage devices including a ROM 15, a RAM 16, and a hard disk 17, and a communication interface 18. The server 1 is connected to the Internet 3 via the communication interface 18 to transmit data to the client terminals 2. The server 1 is not limited to the example shown in FIG. 5. As long as the server 1 has functions for connecting to the Internet 3 and communicating with the client terminals 2, the server 1 does not need to have the input device 13, the display device 14, and the like described above.

Computer program codes for issuing commands to the CPU 12 and the like are stored with the storage devices 15 to 17 in the server 1 to perform operations in cooperation with an operating system (OS) of the server 1. The computer programs are loaded into the RAM 16 for execution.

The computer programs include a program such as a Common Gateway Interface (CGI) program 171, which is executed in response to requests sent from the client terminals 2. The CGI program 171 performs various processes in cooperation with the CPU 12 to constitute a reception component 101, a HyperText Markup Language (HTML) code generation component 102, an effect calculation component 103, a reply component 104, an order acceptance component 105, and the like. These components will be described later. The computer programs also include a Web server program 172 that enables the server 1 to serve as a Web server. These processes and functions may be performed by one computer or by a plurality of computers in cooperation with each other.

Further, HTML files 173 describing information to be provided to the client terminals 2 are stored with the hard disk 17. The HTML files 173 or HTML codes created by the CGI program 171 constitute Web pages including a page presenting possibilities and achievements of energy saving in pumps, an input page, a diagnostic summary page, a tabulation page, an order page, and the like. Specifically, when a request for data is transmitted to the server 1 from the client terminal 2, the HTML file 173 or the HTML codes are transmitted to the client terminal 2 from the server 1. Then, information described by the HTML file 173 or the HTML codes is displayed in a Web browser window or the like on the client terminal 2.

Figure 6:
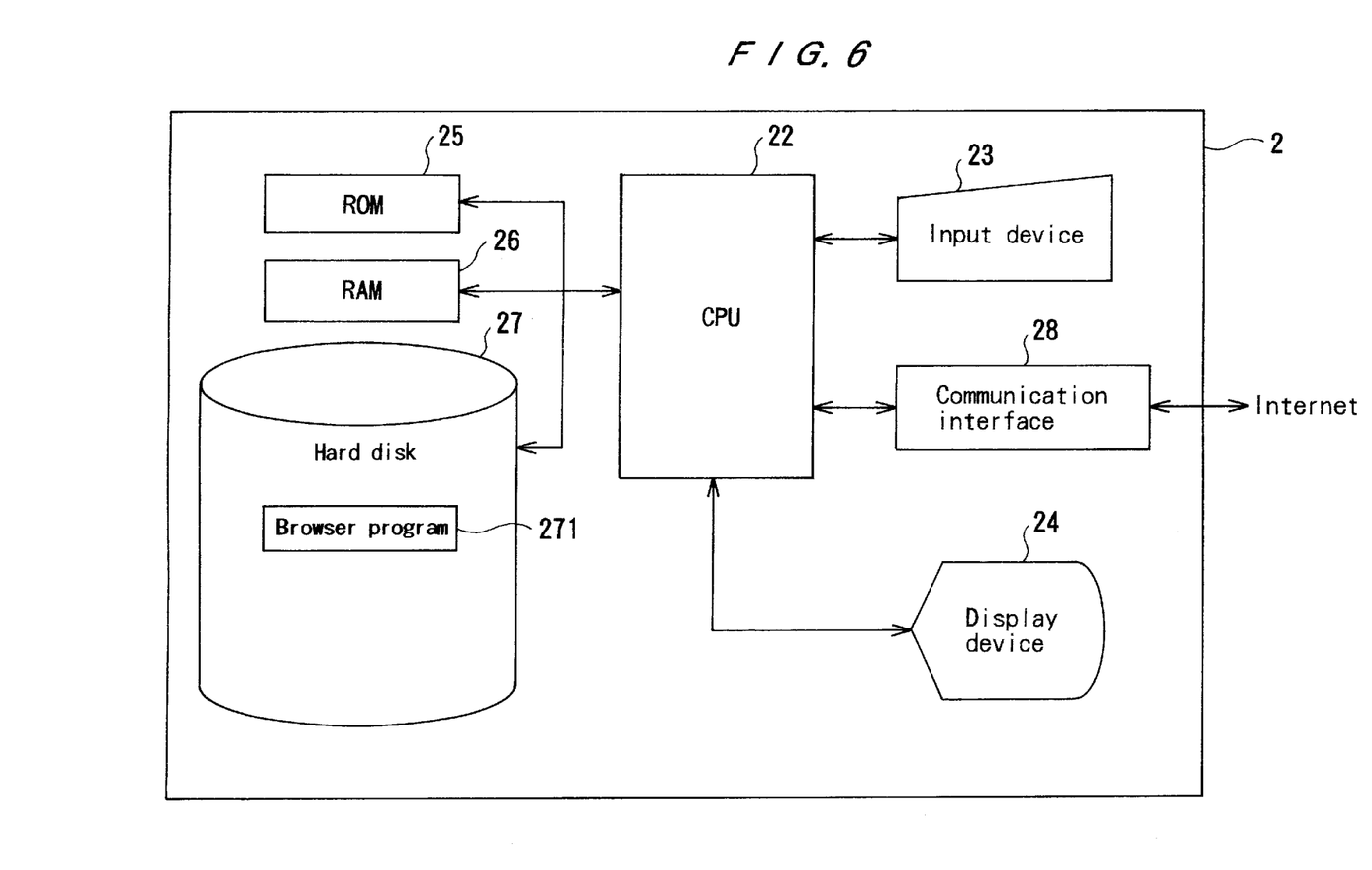
FIG. 6 is a block diagram showing an example of a hardware construction in a client terminal according to the second embodiment of the present invention.

FIG. 6 is a block diagram showing an example of a hardware construction in the client terminal 2 of the second embodiment. The client terminal 2 is configured by a personal computer or the like. As shown in FIG. 6, the client terminal 2 comprises a central processing unit (CPU) 22, an input device 23 such as a keyboard or mouse, a display device 24 such as a monitor, storage devices including a ROM 25, a RAM 26, and a hard disk 27, and a communication interface 28.

Computer program codes for issuing commands to the CPU 22 and the like are stored with the storage devices 25 to 27 in the client terminal 2 to perform operations in cooperation with an OS of the client terminal 2. The computer programs are loaded into the RAM 26 for execution and operation of processes in cooperation with the CPU 22. The computer programs include a program 271 (Web browser program or the like) for displaying contents of Web sites. The user can request information by accessing Web sites via a Web browser started by the program 271.

Figure 7:
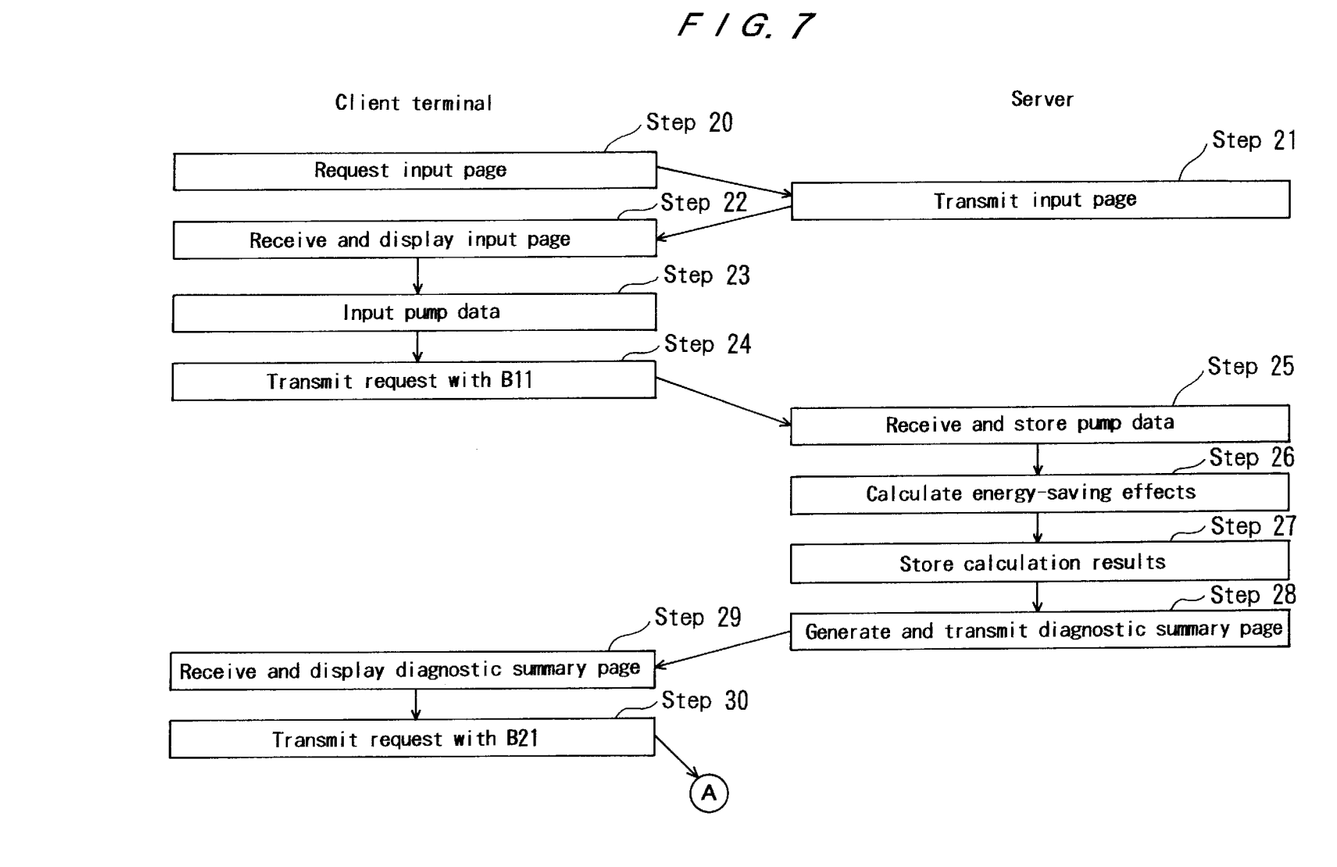
FIG. 7 is a flowchart showing a process flow in a method for promoting energy saving in fluid machinery according to the second embodiment of the present invention.
Figure 8:
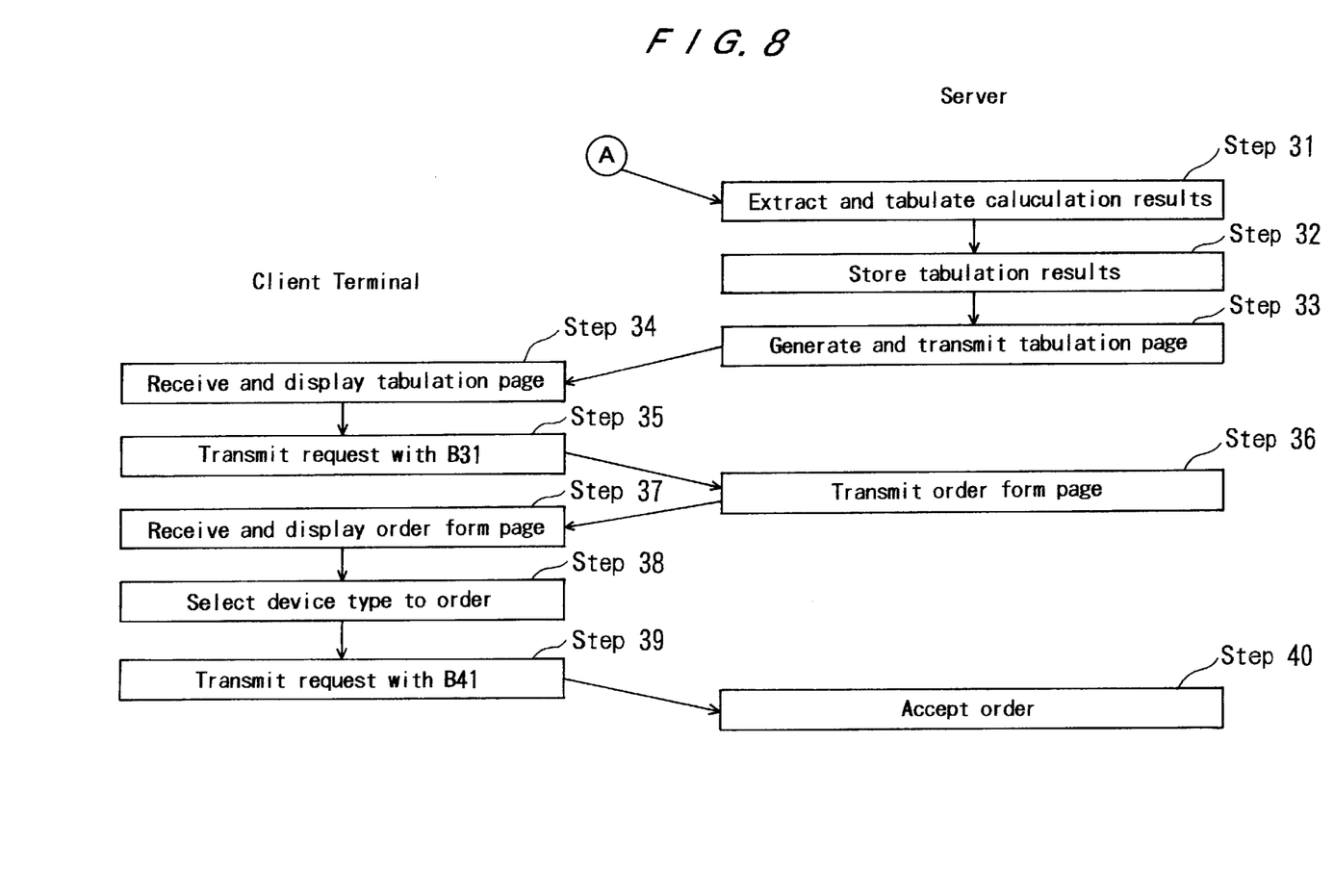
FIG. 8 is a flowchart showing the process flow in the second embodiment of the present invention.

Processes for promoting energy saving in fluid machinery according to the system of the second embodiment will be described below. FIGS. 7 and 8 are flowcharts showing a process flow in the second embodiment.

First, the user operating the client terminal 2 starts the Web browser program installed on the client terminal 2. The user accesses a Web site of the server 1 using the Web browser to request a predetermined HTML file stored on the server 1 (Step 20). The reply component 104 of the server 1 transmits a corresponding HTML file (HTML file constituting an input page) among the HTML files 173 stored on the hard disk 17 to the client terminal 2 upon receiving the request (Step 21).

Figure 9:
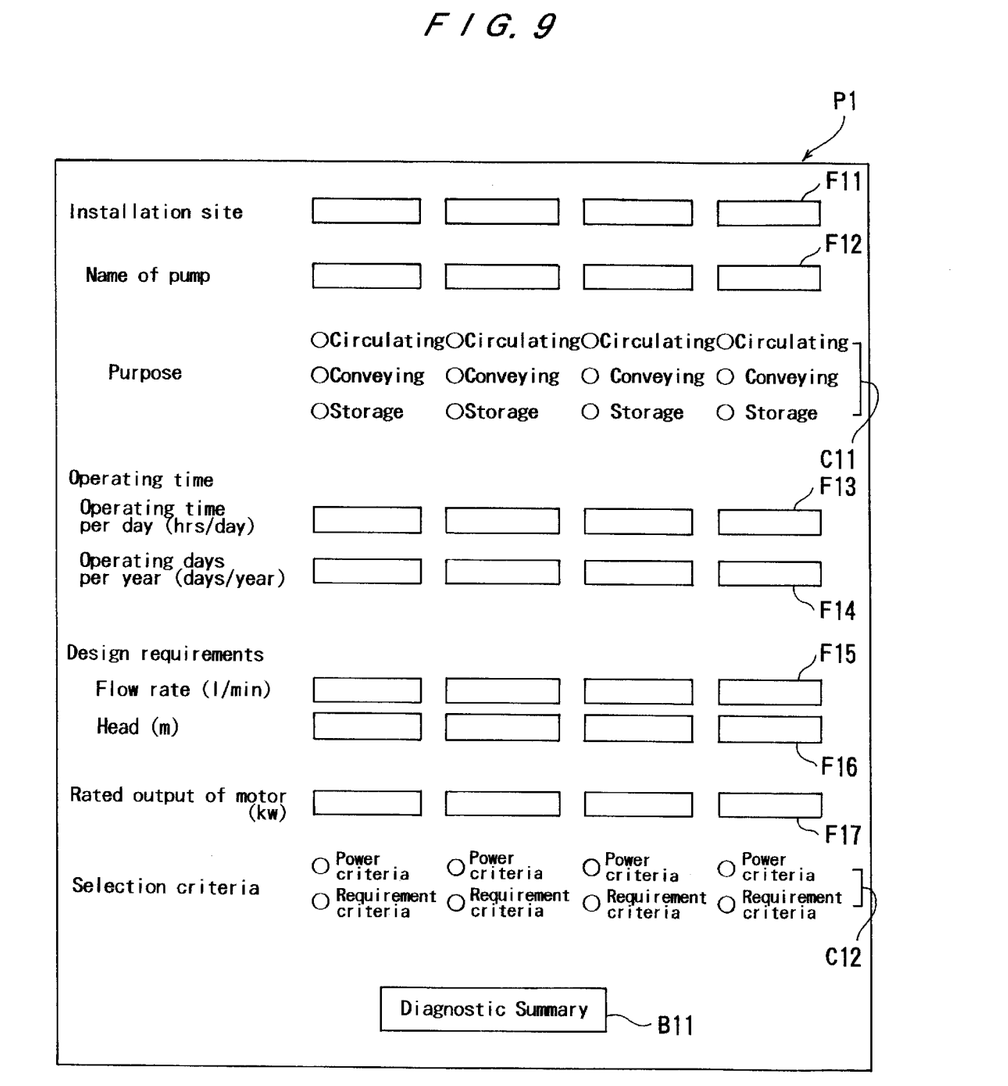
FIG. 9 is a schematic view showing an example of an input page according to the second embodiment of the present invention.

The Web browser on the client terminal 2 receives the HTML file, and the input page P1 shown in FIG. 9 is displayed in the Web browser window (Step 22).

As shown in FIG. 9, the input page P1 includes fields F11 and F12 for inputting an installation site and a name of an existing pump, check boxes C11 for selecting a purpose of the existing pump, check boxes C12 for selecting selection criteria of the pump, fields F13 and F14 for inputting operating hours per day and operating days per year, fields F15 and F16 for inputting a flow rate and a head of design requirements, a field F17 for inputting a rated output of a motor of the pump, and a button B11 for transmitting values inputted into each of the fields and values selected in each of the check boxes to the server 1. In the present embodiment, the values inputted into each of the fields on the input page P1 are used as data specifying the characteristics of the existing pump.

The user inputs names and purposes of the pumps, for example, installed in his factory and the like into the corresponding fields using the input device 23 (Step 23). The button B11 is linked to the program 171 stored on the server 1. When the user clicks the button B11, a request is transmitted to the server 1 via the Web browser (Step 24), and the server 1 starts the program 171 upon receiving the request. Values inputted into the fields and values selected in the check boxes on the input page P1 are transmitted with the request to the program 171. Processes (Steps 25 to 28) performed by the program 171 will be described below.

The values of the fields and the check boxes which are transmitted with the request are received by the reception component 101 of the server 1 and stored in the RAM 16 or on the hard disk 17 (Step 25).

Then, the effect calculation component 103 calculates energy-saving effects such as annual electric power consumption, potential reduction in electric power consumption, potential reduction in power rate, amount of investment, simple payback years, and annual amount of reduced $CO_2$ (Step 26). The energy-saving effects are calculated based on the energy-saving ratio S and the values stored in the RAM 16 or the like in Step 25, in the same manner as that in the first embodiment. The calculation results are stored in the RAM 16 or the like (Step 27).

The HTML code generation component 102 extracts the calculation results from the RAM 16 or the like. Then, the HTML code generation component 102 generates HTML codes for displaying a Web page based on the calculation results, i.e., a diagnostic summary page described later, and the reply component 104 transmits the HTML codes to the client terminal 2 (Step 28).

Figure 10:
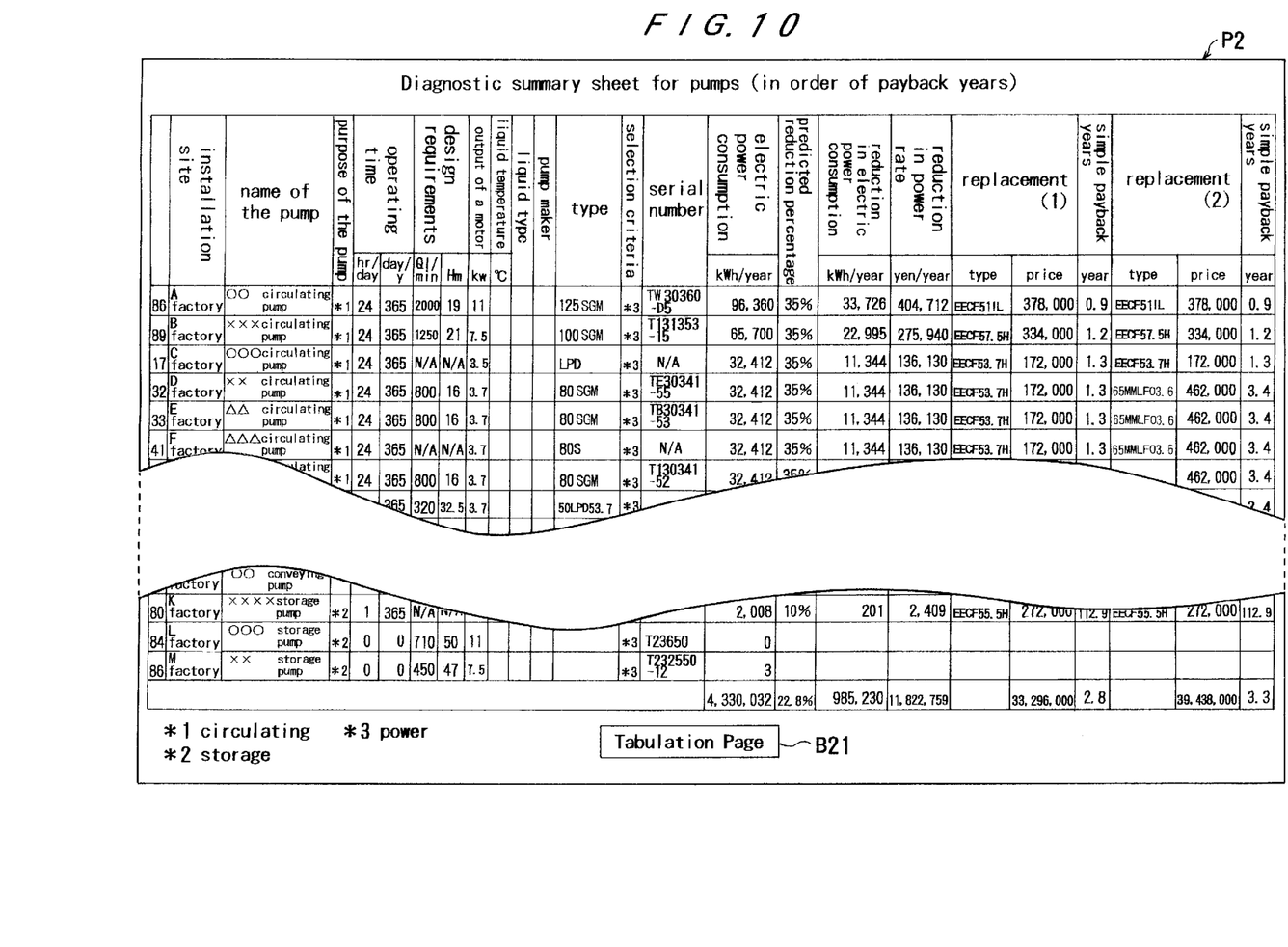
FIG. 10 is a schematic view showing an example of a diagnostic summary page according to the second embodiment of the present invention.

The Web browser on the client terminal 2 receives the HTML codes, and the diagnostic summary page P2 shown in FIG. 10 is displayed in the Web browser window (Step 29).

As shown in FIG. 10, the diagnostic summary page P2 includes a table with the values inputted into the fields on the input page P1, and annual electric power consumption, potential reduction in electric power consumption, potential reduction in power rate, and the like calculated by the effect calculation component 103 in Step 26. The user views the table, so that the energy-saving effects due to introduction of the inverter into the existing pumps can easily be realized.

In the diagnostic summary page P2 shown in FIG. 10, the items are displayed in the order of ascending the payback years. The HTML codes generated by the HTML code generation component 102 of the server 1 may be modified to display the items in the order of descending the potential reduction in electric power consumption, for example. Accordingly, it is possible to examine energy saving from both viewpoints of cost-effectiveness and potential reduction in electric power consumption.

The diagnostic summary page P2 also includes a button B21 for displaying a tabulation page described later. The button B21 is linked to a program 171 on the server 1 as in the case of the button B11 on the input page P1. When the user clicks the button B21, a request is transmitted to the server 1 via the Web browser (Step 30). The server 1 starts the program 171 for performing processes (Steps 31 to 33) described below upon receiving the request.

The effect calculation component 103 extracts the calculation results stored in the RAM 16 or the like in Step 27 and tabulates the results (Step 31). Specifically, average values for the calculation results are tabulated for each purpose (circulating, conveying, and storage). The tabulation results are stored in the RAM 16 or the like (Step 32).

The HTML code generation component 102 extracts the tabulation results from the RAM 16 or the like. Then, the HTML code generation component 102 generates HTML codes for displaying a page based on the tabulation results, i.e., a tabulation page described later, and the reply component 104 transmits the HTML codes to the client terminal 2 (Step 33).

Figure 11:
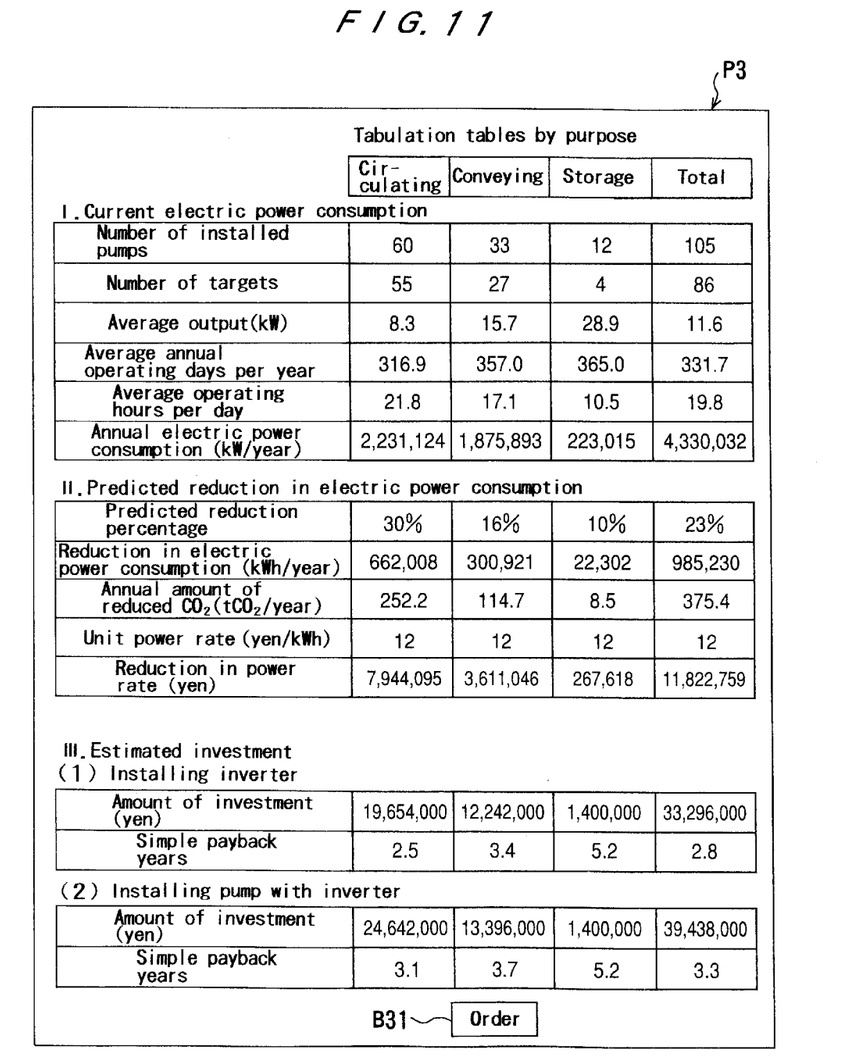
FIG. 11 is a schematic view showing an example of a tabulation page according to the second embodiment of the present invention.

The Web browser on the client terminal 2 receives the HTML codes, and the tabulation page P3 shown in FIG. 11 is displayed in the Web browser window (Step 34).

As shown in FIG. 11, the tabulation page P3 includes a tabulation of current power consumption, expected reduction in electric power consumption, and estimation of an amount of investment for each purpose (circulating, conveying, and storage). Specifically, the results of the tabulation calculated by the effect calculation component 103 in Step 31 are displayed in the Web browser. The user views the tabulation page P3, so that the energy-saving effects due to introduction of the inverter into the existing pumps can easily be realized.

As shown in FIG. 11, the tabulation page P3 includes a button B31 for displaying an order page described later. The button B31 is linked to an HTML file 173 on the server 1. When the user clicks the button B31, a request is transmitted to the server 1 via the Web browser (Step 35). The reply component 104 of the server 1 transmits a corresponding HTML file (HTML file constituting the order page) to the client terminal 2 upon receiving the request (Step 36).

Figure 12:
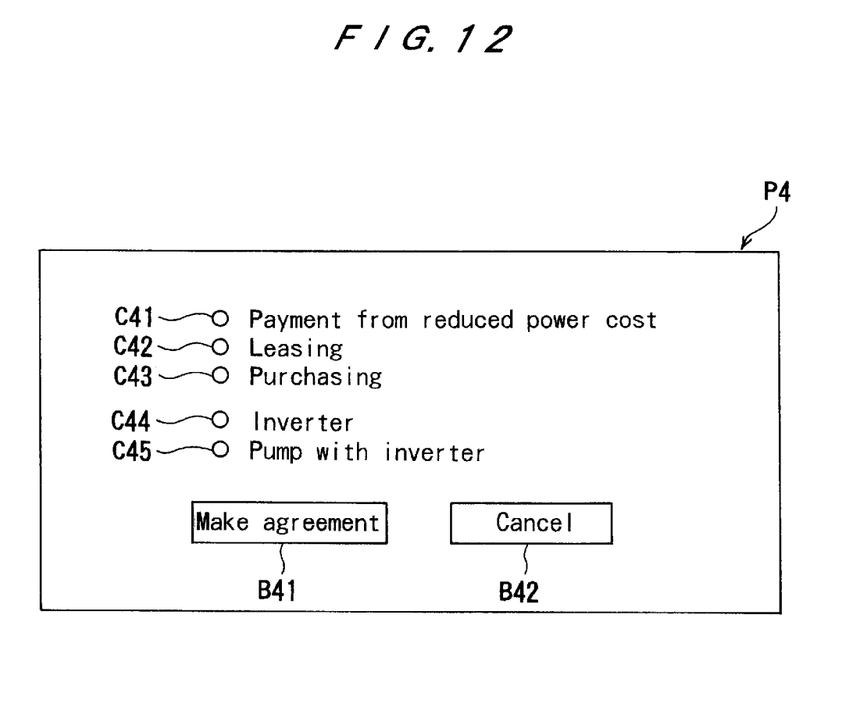
FIG. 12 is a schematic view showing an example of an order page according to the second embodiment of the present invention.

The Web browser on the client terminal 2 receives the HTML file, and the order page P4 shown in FIG. 12 is displayed in the Web browser window (Step 37).

As shown in FIG. 12, the order page P4 includes check boxes C41 to C43 for selecting a form of an agreement, check boxes C44 and C45 for selecting a device type for the agreement, a button B41 for accepting the agreement, and a button B42 for canceling the agreement. The check boxes for selecting a form of an agreement comprise three check boxes, i.e., a check box C41 for payment from reduced power cost, a check box C42 for leasing, and a check box C43 for purchasing. The check boxes for selecting a device type comprise a check box C44 for inverter, and a check box C45 for a pump with an inverter.

The user selects a form of an agreement and a device type using the check boxes C41 to C45 (Step 38). When the user clicks the button B41, a request with the selected form of the agreement and device type is transmitted to the server 1 (Step 39). The transmitted form of the agreement and device type are received by the order acceptance component 105 and stored on the hard disk 17 in the server 1. Then, an order is accepted (Step 40).

When the user selects an agreement form of payment from reduced power cost, the service provider introduces the inverter into the existing pumps gratis, in exchange for payment of all or a part of the actual reduced cost (power rate) due to introduction of the inverter, as described above.

Processes performed after the order is accepted are the same as those described in the first embodiment and will not be described below. In order to measure and confirm the energy-saving effects due to introduction of the inverter, an installed wattmeter may be utilized for measuring transitive electric power during a certain period. Then, data on electric power transition may be transmitted to the server 1 via a network such as a mobile phone network or a wireless network. In this case, the data for different pump purposes may statistically be stored on the server 1. Such data can also be utilized for calculation of an actual reduced cost in the aforementioned agreement form of payment from reduced power cost.

In the present embodiment, only the case of a diagnostic summary is described. However, it is preferable to calculate based on an actual site survey before making an agreement, as described in the first embodiment. In this case, calculation results based on the actual site survey may be transmitted to the server 1 from the site via a network such as a mobile phone network or a wireless network, for example. Such calculation results can be offered to the user as in the case of the diagnostic summary page P2 or tabulation page P3 described above.

Ideally, the energy-saving effects measured after introduction of the inverter will be substantially equal to the energy-saving effects estimated in the diagnostic summary and the energy-saving effects calculated based on a site survey. Therefore, actual values measured at the site may be transmitted to the server 1 in order to modify the average energy-saving ratios S stored in the server 1. This causes diagnoses performed by the service provider to be more accurate.

The input page P1 described above may include other various fields for inputting an address and a company name of the user, date on which the energy-saving device was installed, transition of power consumption, and the like. Further, values inputted into these fields may be stored as customer data in a database on the server 1. Such customer data can be utilized for maintenance, after-sales service, or the like. For example, this database can be useful in determining a period for replacing a smoothing capacitor used in the inverter (for example, every 300,000 hours of operation), a period for replacing bearings in the pump, and the like. Thus, more efficient and logical maintenance on a predetermined schedule can be achieved by such a database.

In the present embodiment, the server 1 comprises a Web server. However, the server 1 may comprise other server capable of communicating with the client terminals 2. The contents and structures of the Web pages shown in the drawings are merely examples and are not limited to these contents and structures.

As described above, according to the present invention, an energy-saving effect in fluid machinery can easily be realized without performing complex simulations, and energy saving can positively be promoted without imposing a burden on the user.

Although certain preferred embodiments of the present invention have been shown and described in detail, it should be understood that various changes and modifications may be made therein without departing from the scope of the appended claims.

What is claimed is:

1. A method for reducing electric power consumption and promoting energy saving in fluid machinery by introducing an energy-saving device into existing fluid machinery, said method comprising:

submitting data specifying characteristics of said fluid machinery of a user to a service provider;

estimating an energy-saving effect due to introduction of said energy-saving device into said fluid machinery based on said data specifying characteristics of said fluid machinery and an energy-saving ratio predetermined according to a purpose of said fluid machinery;

selecting an effective energy-saving device to be introduced;

offering the estimated energy-saving effect, the selected energy saving device, and a form of a transaction for the selected energy saving device, wherein said form of said transaction is selected from options including at least two of (1) purchasing, (2)

leasing, and (3) introduction of the selected energy-saving device into said fluid machinery gratis in exchange for payment of all or a part of an actual reduced cost due to the introduction of the selected energy-saving device.

2. A transaction method for promoting energy saving in fluid machinery, said transaction method comprising:

estimating an energy-saving effect of said fluid machinery based on data specifying characteristics of said fluid machinery; and offering said estimated energy-saving effect, energy-saving device meeting said estimated energy-saving effect, and a form of a transaction for said energy-saving device, wherein said form of said transaction is selected from options including at least two of (1) purchasing, (2) leasing, and (3) introduction of said energy-saving device into said fluid machinery gratis in exchange for payment of all or a part of an actual reduced cost.

3. A method for reducing electric power consumption and promoting energy saving in fluid machinery by introducing an energy-saving device into existing fluid machinery, said method comprising:

offering said energy-saving device and a form of a transaction for said energy-saving device;

wherein said form of said transaction is selected from options including at least two of (1) purchasing, (2) leasing, and (3) introduction of said energy-saving device into said fluid machinery gratis in exchange for payment of all or a part of an actual reduced cost due to the introduction of said energy-saving device.

4. A transaction method for promoting energy saving in fluid machinery, said transaction method comprising:

offering an energy-saving device and a form of a transaction for said energy-saving device, wherein said form of said transaction is selected from options including at least two of (1) purchasing, (2) leasing, and (3) introduction of said energy-saving device into said fluid machinery gratis in exchange for payment of all or a part of an actual reduced cost.

5. A method for reducing electric power consumption and promoting energy saving in fluid machinery by introducing an energy-saving device into existing fluid machinery, said method comprising:

offering a cost for the introduction of said energy-saving device and an estimated energy-saving effect due to the introduction of said energy-saving device before the introduction of said energy-saving device; and offering, to a user, an actual reduced cost due to the introduction of said energy-saving device after the introduction of said energy-saving device, wherein a transaction for said energy-saving device is selected from options including at least two of (1) purchasing, (2) leasing, and (3) introduction of said energy-saving device into said fluid machinery gratis in exchange for payment of all or a part of an actual reduced cost.

6. A method for reducing electric power consumption and promoting energy saving in fluid machinery of a user, comprising:

submitting data specifying characteristics of said fluid machinery of the user to a service provider;

estimating, by said service provider, an energy-saving effect due to an introduction of one of a plurality of energy-saving devices into said fluid machinery based on said data specifying characteristics of said fluid machinery and an energy-saving ratio predetermined according to a purpose of said fluid machinery;

selecting, from said plurality of energy-saving devices, an effective energy-saving device to be introduced into said fluid machinery;

offering the estimated energy-saving effect, the selected energy-saving device, and a form of a transaction for the selected energy saving device to the user, wherein said form of said transaction is selected from options including at least two of (1) purchasing, (2) leasing, and (3) introduction of the selected energy-saving device into said fluid machinery gratis in exchange for payment of all or a part of an actual reduced cost resulting from the introduction of said energy-saving device.

* * * * *